United States Patent [19]

Imura

[11] Patent Number: 4,814,602

[45] Date of Patent: Mar. 21, 1989

[54] PHOTOELECTRIC CONVERSION PROCESSING APPARATUS

[75] Inventor: Kenji Imura, Osaka, Japan

[73] Assignee: Minolta Camera Kabushiki Kaisha, Osaka, Japan

[21] Appl. No.: 192,591

[22] Filed: May 11, 1988

Related U.S. Application Data

[63] Continuation of Ser. No. 49,701, May 13, 1987, abandoned.

[30] Foreign Application Priority Data

May 16, 1986 [JP] Japan .................................. 61-113375

[51] Int. Cl.$^4$ .............................................. G01V 3/50
[52] U.S. Cl. ..................................... 250/226; 250/233; 250/354.1; 250/205; 356/226
[58] Field of Search ............... 250/205, 226, 233, 338, 250/342, 351, 354.1; 356/219, 221, 222, 226

[56] References Cited

U.S. PATENT DOCUMENTS 3,821,553 6/1974 French ............................ 250/354.1
4,678,338 7/1987 Kitta et al. ........................ 250/226

OTHER PUBLICATIONS

R. S. Young, A New Infra-Red Radiation Pyrometer, Journal Sci. Instrum., 1967, vol. 44, pp. 988-992.
Samuel A. Elder, Designing Photogranisistor Pyrometers, Electronics, 12/8/61, pp. 56-60.

Primary Examiner—David C. Nelms
Attorney, Agent, or Firm—Price, Gess & Ubell

[57] ABSTRACT

A photoelectric conversion processing apparatus includes a chopper which opens and closes a pinhole provided in the apparatus to intermittently apply incident energy from a target object to a PbS device. Thus, only when the pinhole is opened, the incident energy is applied to the PbS device and when the pinhole is closed, a LED emits light by control of a control circuit so that the emitted light may be incident on the PbS device and a silicon photodiode. The control circuit controls the emission of the light by the LED so that an output level of the PbS device to which the incident energy is applied through the pinhole being opened and an output level of the PbS device to which the energy from the LED is applied may be equal to each other. Consequently, an output of the silicon photodiode for detecting the radiation energy from the LED represents intensity of the incident energy from the target object, detected indirectly by the PbS device.

22 Claims, 7 Drawing Sheets

PHOTOELECTRIC CONVERSION PROCESSING APPARATUS

This is a continuation of application Ser. No. 049,701, filed on May 13, 1987, now abandoned.

BACKGROUND OF THE INVENTION

1. Field of the Invention

The present invention relates to a photoelectric conversion processing apparatus. More particularly, the present invention relates to a photoelectric conversion processing apparatus provided with a photodetector such as a silicon photodiode having a sensitivity which exhibits little dependency on temperature so that an output signal thereof is proportional to incident energy.

2. Description of the Prior Art

A silicon photodiode (SPD) is a photodetector which provides an output signal i in good proportion to incident energy I (i.e., $\gamma=1$ in the case of $i=k \cdot I^\gamma$ where k is a proportion constant and $\gamma$ is an exponent for intensity of incident energy) and has a sensitivity exhibiting insignificant dependency on temperature. However, it is difficult to utilize a silicon photodiode as a photodetector for detecting incident energy having wavelength of more than 1 $\mu$m, for example, 2 $\mu$m, since its sensitive wavelength range (i.e., spectrum sensitivity) extends from the visible region only up to approximately 1 $\mu$m.

Therefore, in order to form a photodetector for detecting incident energy having wavelength of 1 to 3 $\mu$m for example, a device of PbS is conventionally used. The PbS device has a sensitive wavelength range from the visible region to approximately 3 $\mu$m and it has advantages that incident energy of longer wavelength can be detected compared with a silicon photodiode and that cooling by liquid nitrogen is not needed.

However on the other hand, the PbS device has disadvantages as described below. An output signal i of the PbS device is not exactly proportional to incident energy I ($i=k \cdot I^{\gamma(I)}$). More specifically, the exponent $\gamma$ is dependent upon the incident energy I. In addition, the PbS device has sensitivity exhibiting significant dependency on temperature. Thus, there is considerable drift in temperature. Furthermore, since it is of a photoconductive type, bias voltage is required. The comparison of the advantages and disadvantages of a silicon photodiode and a PbS device is as shown in the following Table.

|     | Sensitive Wavelength | Proportion Constant | Dependency on Temperature |
| --- | --- | --- | --- |
| SPD | short | $\gamma = 1$ | not significant |
| PbS | long | $\gamma = \gamma(I)$ | significant |

Figure 1:
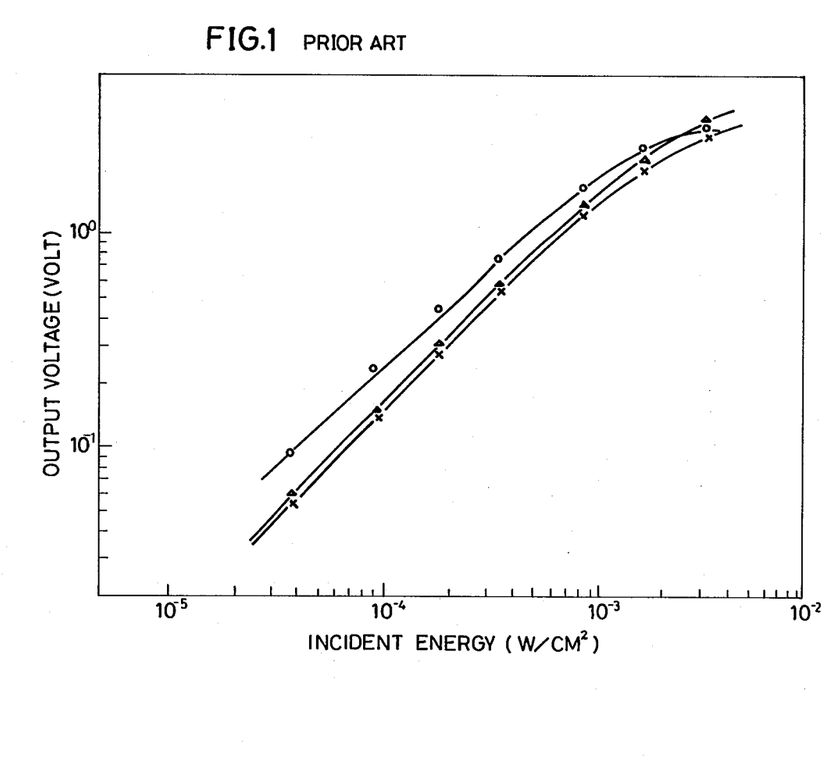
FIG. 1 is a graph showing incident energy/output voltage characteristics of conventional PbS devices.

As is evident from the diagram of incident energy and output voltage characteristics of three PbS devices shown in FIG. 1, the exponent $\gamma$ shows considerable irregularities dependent on the individual PbS devices. In addition, there is further involved a serious fundamental problem that the exponent $\gamma$ in the same PbS device varies dependent on the intensity of incident energy ($\gamma=\gamma(I)$). Consequently, in order to measure incident energy by conversion from an output signal of a PbS device, it is necessary to obtain, by carrying out experiments, the exponent $\gamma$ of each PbS device with respect to various values of incident energy intensity.

Figure 2:
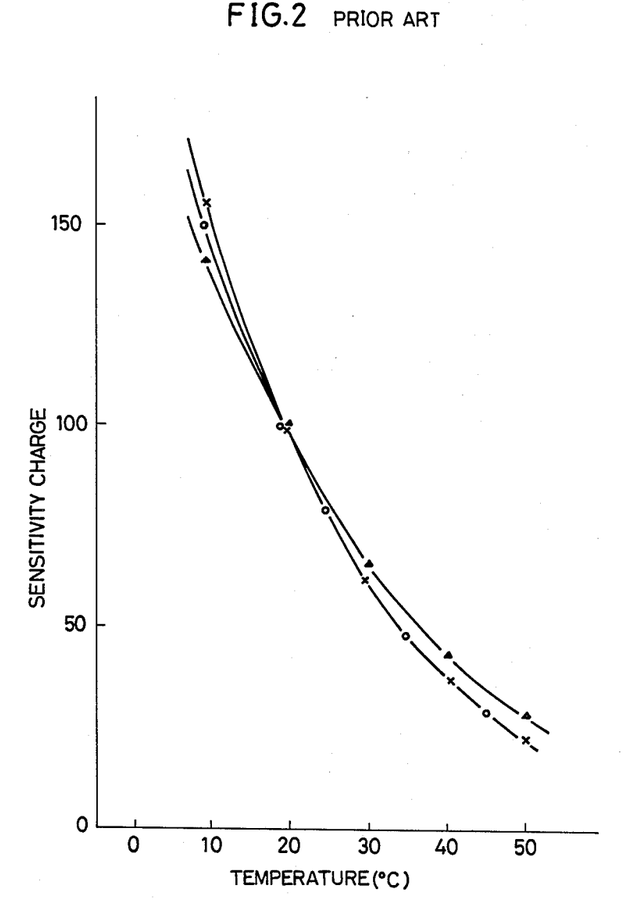
FIG. 2 is a graph showing temperature characteristics of sensitivity of the conventional PbS devices.

In addition, as is evident from the diagram of the temperature characteristics for sensitivity of PbS device shown in FIG. 2, the temperature coefficient shows considerable irregularities dependent on the individual PbS devices and there is further involved a fundamental problem that the temperature coefficient varies dependent on temperature even in the case of the same PbS device. Consequently, in order to apply temperature correction to an output signal, it is necessary to obtain, by carrying out experiments, the temperature coefficient of each PbS device with respect to various temperatures on the PbS devices.

Thus, it is extremely troublesome to obtain various exponents $\gamma$ and temperature coefficients by experiments and it is further difficult to make suitable corrections based on the thus obtained values in a real measuring operation.

SUMMARY OF THE INVENTION

An object of the present invention is to provide a photoelectric conversion processing apparatus using first and second photodetecting means having different advantageous and disadvantageous characteristics, whereby the respective advantageous characteristics can be effectively utilized by offsetting the respective disadvantageous characteristics.

The present invention comprises: first photodetecting means for detecting radiation energy coming from a target object; optical control means for intermittently intercepting the incidence of the radiation energy from the target object onto the first photodetecting means; second photodetecting means for detecting the radiation energy from the target object, the second photodetecting means having spectrum sensitivity partially overlapping with a spectrum sensitivity of the first photodetecting means in a prescribed wavelength range; radiation emitting means for emitting radiation of a wavelength included in the prescribed wavelength range, th radiation emitting means being disposed so that the radiation emitted therefrom may be incident on the first and second photodetecting means; radiation emission control means for controlling the emission of radiation of the radiation emitting means to cause the radiation emitting means to emit radiation during a period in which the optical control means intercepts incidence of the radiation from the target object onto the first photodetecting means and to cause an output of the first photodetecting means in the period of interception to be in a prescribed relation with an output of the first photodetecting means during a period in which the optical control means permits incidence of the radiation from the target object onto the first photodetecting means; and measuring means for measuring energy of the radiation from the target object based on an output of the second photodetecting means.

In the photoelectric conversion processing apparatus of the present invention thus constructed, emission of the radiation from the radiation emitting means is controlled by the radiation emission control means so that the output of the first photodetecting means during the period in which incidence of the radiation from the target object onto the first photodetecting means is intercepted by the optical control means may be in a prescribed relation with the output of the first photodetecting means during the period in which incidence of the radiation from the object onto the first photodetecting means is permitted. Thus, emission of the radiation from the radiation emitting means is controlled according to the intensity of the radiation energy from the target object, detected by the first photodetecting means. Accordingly, the output of the second photodetecting means for detecting the radiation energy from the radiation emitting means indirectly represents the intensity of the radiation energy from the object detected by the first photodetecting means. At the same time, influences due to dependency of the first photodetecting means on temperature or on intensity of the incident energy can be excluded by the control of emission of the radiation from the light emitting means.

Thus, the intensity of the radiation energy from the target object is detected not directly from the output of the first photodetecting means, but indirectly based on the output of the second photodetecting means by control of emission of the radiation from the radiation emitting means which emits radiation in the prescribed wavelength range contained in both of the spectrum sensitivity ranges of the first and second photodetecting means. As a result, the intensity of the radiation energy from the target object can be detected with high precision, independent of the unfavorable characteristics of the first photodetecting means.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
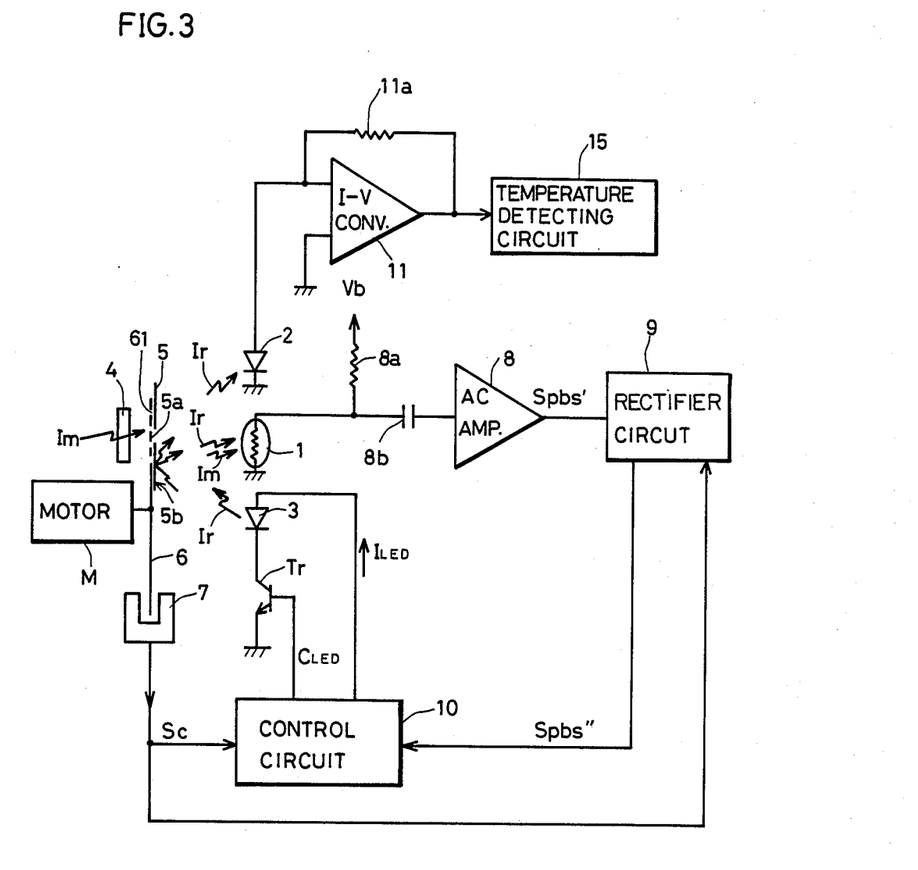
FIG. 3 is a concrete electric circuit diagram showing a photoelectric conversion processing apparatus according to a first embodiment of the present invention.

With reference to FIG. 3, there is shown according to a photoelectric conversion processing apparatus a first embodiment of the present invention, which is adapted to measure incident radiation having a wavelength range around 2 $\mu m$.

The embodiment shown in FIG. 3 comprises a PbS device 1 used as a first photodetector, a silicon photodiode 2 used as a second photodetector, a light emitting diode (LED) 3, and a filter 4.

Figure 4:
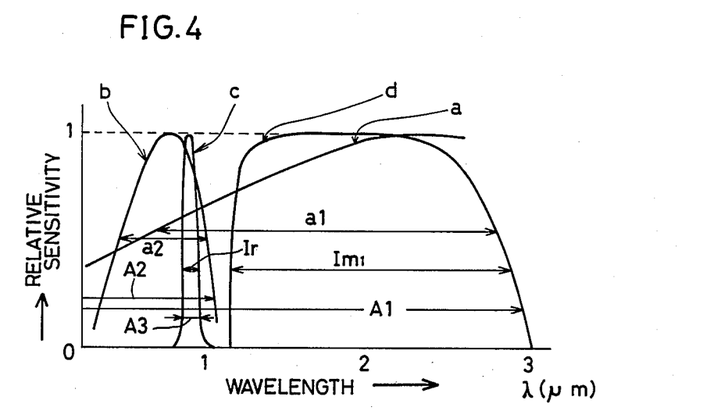
FIG. 4 is a diagram showing a spectrum sensitivity of a PbS device, a spectrum sensitivity of a silicon photodiode, a spectral distribution of luminous intensity of a LED, and a spectral transmittance of a filter.

FIG. 4 shows a spectrum sensitivity a of the PbS device, a spectrum sensitivity b of the silicon photodiode, a spectral distribution c of luminous intensity of the light emitting diode, and a spectral transmittance d of the filter. In FIG. 4, the abscissa represents wavelength $\lambda(\mu m)$ and the ordinate represents relative sensitivity.

As can be seen from the spectrum sensitivity a of the PbS device 1 shown in FIG. 4, a first sensitive or detectable wavelength range A1 related to the Pbs device 1 extends from the visible radiation region to approximately 3 $\mu m$ and, as can be seen from the spectrum sensitivity b of the silicon photodiode 2, a second sensitive or detectable wavelength range A2 related to the silicon photodiode 2 extends from the visible radiation region to approximately 1 $\mu m$. In addition, as can be seen from the spectral distribution c of the luminous intensity of the LED3, a central portion of the wavelength range A3 of the luminous intensity of the LED3 corresponds to less than 1 $\mu m$ and this portion is commonly contained in the detectable wavelength ranges A1 and A2. The wavelength ranges, A2 and A3, may have radiation emissions beyond that shown in the preferred embodiment of FIG. 4 as long as discernible wavelength emissions are available for our computations. A prescribed sensitivity region a1 of the PbS device 1 and a prescribed sensitivity region a2 of the silicon photodiode 2 partially overlap with one another. The filter 4 transmits a wavelength component longer than the maximum wavelength of the second detectable wavelength range A2 of the silicon photodiode 2.

Referring back to FIG. 3, a concrete construction of the first embodiment of the present invention will be described. A pinhole plate 5 is provided between the PbS device 1 and the filter 4. This plate 5 has a pinhole 5a at the center thereof. A reflection face 5b is formed in an area of the plate 5. A chopper 6 in the form of a disc is provided rotatably to intercept incident energy Im coming from a target object to be applied from the filter 4 to the PbS device 1 through the pinholes 5a. This chopper 6 includes a plurality of openings 61 and when one of the openings 61 coincides with the pinholes 5a, the incident energy Im is applied to the PbS device 1 through the filter 4. The chopper 6 is driven by a motor M. The chopper 6 rotates to cover the pinhole 5a, thereby to intermittently intercept the energy to be applied to the PbS device 1. Thus, a period required for obtaining from the LED3 radiation energy having a level equal to that of the incident energy is assured. There is further provided a photo interrupter 7 for detecting intermittent application of the incident energy Im to the PbS device 1 caused by opening an closing the pinhole 5a by rotation of the chopper 6.

The PbS device 1, the silicon photodiode 2 and the LED3 are provided on the side opposed to the reflection face 5b of the plate 5. The PbS device 1 is located on a line extending from the central axis of the pinhole 5a so that incident energy Im1 to be measured, transmitted through the filter 4, out of the incident energy Im is directly applied to the PbS device 1 and that radiation energy Ir1 reflected from the reflection face 5b, out of the radiation energy Ir from the LED3 is applied to the PbS device 1. On the other hand, the silicon photodiode 2 is located outside a range of application of the incident energy Im1 to be measured, so that only radiation energy Ir2 reflected from the reflection face 5b, out of the radiation energy Ir is applied to the silicon photodiode 2. The filter 4 functions to transmit only a light having a wavelength from a little larger than 1 $\mu m$ to 3 $\mu$ out of the first detectable wavelength range A1 and to cut other wavelength shown in FIG. 4.

One end of the PbS device 1 is grounded and another end thereof is connected to an input terminal of an Ac amplifier 8 through a condenser 8b. The condenser 8b cuts a DC component contained in an output of the PbS device 1 and DC power Vb is applied at a point of connection between the condenser 8b and the Pbs device 1 through a resistor 8a. The AC amplifier 8 amplifies the output of the PbS device 1 and supplies the amplified output Spbs' to a rectifier circuit 9. The rectifier circuit 9 receives an open/close state detection signal Sc from the photo interrupter 7. Then, the rectifier circuit 9 rectifies the output Spbs' of the AC amplifier 8 in synchronism with the open/close state detection signal Sc. A rectified output Spbs" of the rectifier circuit 9 is supplied to a control circuit 10. The control circuit 10 supplies a control signal $C_{LED}$ to a transistor Tr so that the transistor Tr is turned on and off to control flow of electric current $I_{LED}$ in the LED3.

More specifically, the open/close state detection signal Sc is supplied form the photo interrupter 7 to the control circuit 10 and if a close state is detected at a high (H) level of the open/close state detection circuit Sc, the control signal $C_{LED}$ is outputted to turn on the transistor Tr so that the electric current $I_{LED}$ flows in the LED3. As a result, radiation energy Ir is outputted from the LED 3. At the same time, feedback of the electric current $I_{LED}$ is controlled so that the output Spbs" from the rectifier circuit 9 falls to a level 0 (zero).

An output of the silicon photodiode 2 is supplied to an input terminal of a current/voltage converting circuit 11. Another input terminal of the current/voltage converting circuit 11 is grounded and a feedback resistor 11a is connected between the first input terminal and an output terminal. The current/voltage converting circuit 11 converts output current of the silicon photodiode 2 to a voltage and supplies the voltage to a temperature detecting circuit 15. The temperature detecting circuit 15 detects a temperature to be measured, in response to the output signal $S_{SPD}$ of the current/voltage converting circuit 11.

The operation of the first embodiment will be described in the following with reference to the timing chart in FIG. 5.

When one of the openings 61 of the chopper 6 coincides with the pinhole 5a, the incident energy Im1 to be measured, which is obtained by cutting the unnecessary wavelength components of the incident energy Im through the filter 4, is applied to the PbS device 1. When the closed portion of the chopper 6 faces the pinhole 5a, the incident energy Im1 to be applied to the PbS device 1 is intercepted. Thus, as shown in (A) of FIG. 5, the incident energy Im1 is intermittently applied to the PbS device 1 according to rotation of the chopper 6.

On the other hand, opening and closing of the pinhole 5a by the chopper 6 are detecting by the photo interrupted 7 so that the open/close state detection signal Sc alternately changing to the H level and the L level is inputted to the rectifier circuit 9 and the control circuit 10. When the pinhole 5a is closed by the chopper 6, the open/closed state detection signal Sc attains the H level. Accordingly, the control signal $C_{LED}$ is outputted from the control circuit 10 to turn on the transistor Tr, whereby electric current $I_{LED}$ flows in the LED3 to cause the LED 3 to emit radiation energy Ir. Out of this radiation energy Ir, radiation energy Ir1 reflected from the reflection face 5b is applied to the PbS device 1. If the open/close state detection signal Sc falls to the L level, the transistor Tr is turned off and application of the radiation energy Ir1 to the PbS device 1 is stopped. Thus, as shown in (B) of FIG. 5, the radiation energy Ir1 is intermittently applied to the PbS device 1 according to rotation of the chopper 6.

Figure 5:
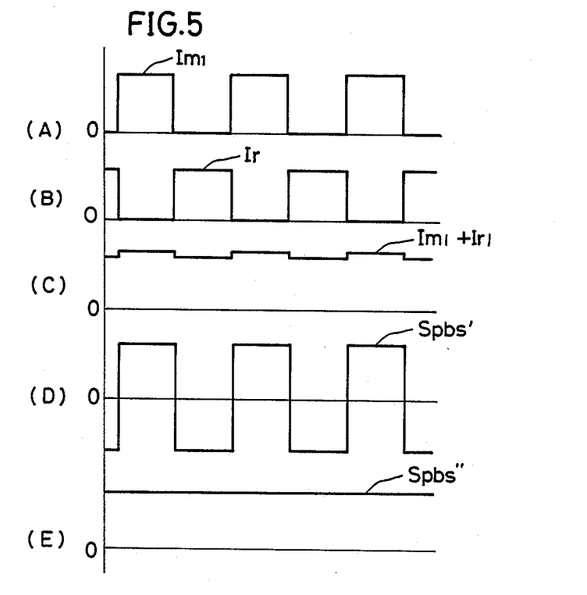
FIG. 5 is a timing chart for explaining operation of the first embodiment of the present invention.

In consequence, the radiation energy applied to the PbS device 1 according to rotation of the chopper 6 is Im1 + Ir1 as shown in (C) of FIG. 5. Normally, a value of the incident energy Im1 to be measured and a value of the radiation energy Ir1 are different and thus the radiation energy (Im1 + Ir1) has an AC component. Accordingly, an output waveform of the PbS device 1 has also an AC component.

A DC component of the output of the PbS device 1 is cut by the condenser 8b and only the AC component is inputted to the AC amplifier 8, where it is amplified. A waveform of the output Spbs' of the AC amplifier 8 is as shown in (D) of FIG. 5. The output Spbs' is rectified by the rectifier circuit 9 so that a DC output Spbs" as shown in (E) of FIG. 5 is obtained. Since the DC output Spbs" is normally not at the level 0, the electric current $I_{LEd}$ is supplied from the control circuit 10 to the LED3 and the electric current $I_{LED}$ is controlled so that the output Spbs" of the rectifier circuit 9 attains the level 0. As a result, a level of the incident energy Im1 to be measure is equal to a level of the radiation energy Ir1. Thus, intensity of the incident energy applied to the PbS device 1 is always maintained constant irrespective of whether the incident energy Im1 to be measured is applied thereto or intercepted by rotation of the chopper 6.

On the other hand, another part of the energy reflected from the reflection face 5b is applied to the silicon photodiode 2 as radiation energy Ir2. The radiation energy Ir2 applied to the silicon photodiode 2 is proportional to the radiation energy Ir1 applied to the PbS device 1 and accordingly the radiation energy Ir2 is also proportional to the incident energy Im1 to be measured, transmitted through the filter 4, since the incident energy Im1 has intensity equal to that of the radiation energy Ir1.

Therefore, measurement of the radiation energy Ir2 applied to the silicon photodiode 2 is equivalent to measurement of the incident energy Im.

A wavelength range of the incident energy Im1 to be measured is included in the detectable wavelength range A1 of the PbS device 1 and does not exist in the detectable wavelength range A2 of the silicon photodiode 2. Accordingly, the incident energy Im1 to be measured can not be detected inherently by the silicon photodiode 2. However, the silicon photodiode 2 measures the radiation energy Ir2 of the LED3 having the wavelength range A3 commonly existing in both of the detectable wavelength ranges A1 and A2, and it follows that the incident energy Im1 can be finally measured by the silicon photodiode 2. In other words, even the incident energy Im1 having a longer wavelength outside the detectable wavelength range A2 can be measured by the silicon photodiode 2.

The silicon photodiode 2 provides the output signal proportional to the incident energy and has sensitivity exhibiting little dependency on temperature, as described above. Consequently, the silicon photodiode 2 is capable of measuring the incident energy Im1 with high precision and with little error. Thus, it becomes possible to measure, with high precision, the incident energy Im1 in a long wavelength range, which could not be measured conventionally. In addition, since the LED3 is illuminated by pulses, the output $S_{SPD}$ of the current/voltage converting circuit 11 also becomes an AC signal and, as a result, influence by dark current in the silicon photodiode 2 can be avoided. Consequently, by detection of an output of the silicon photodiode 2, a temperature to be measured can be detected.

Figure 6:
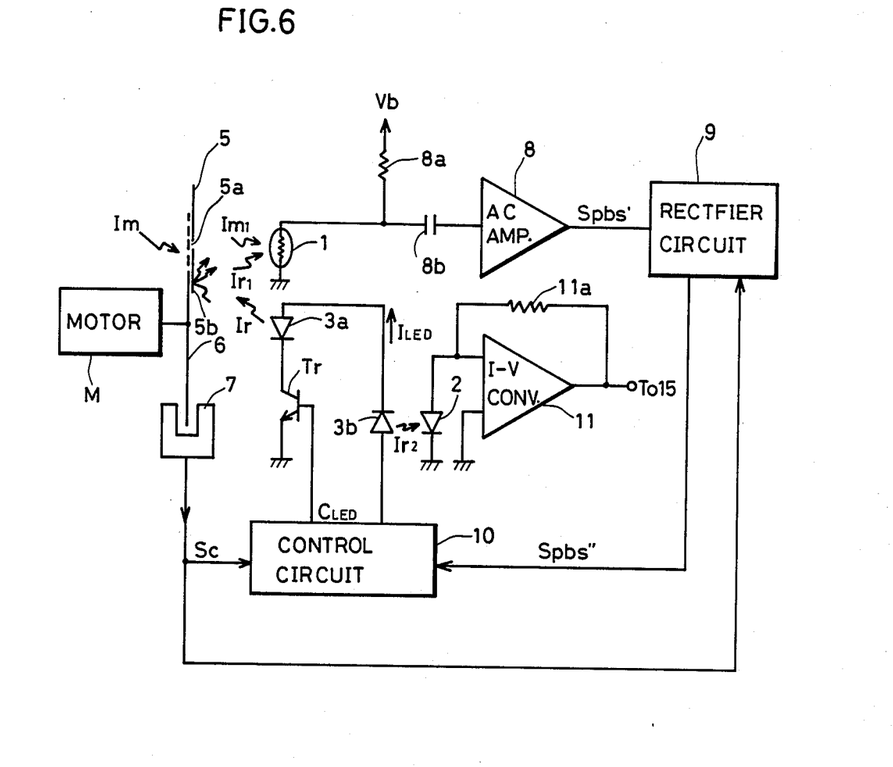
FIG. 6 is an electric circuit diagram of a photoelectric conversion processing apparatus according to a second embodiment of the present invention.

FIG. 6 is an electric circuit diagram of a photoelectric conversion processing apparatus of a second embodiment of the present invention. The photoelectric conversion processing apparatus shown in FIG. 6 is the same as the photoelectric conversion processing apparatus shown in FIG. 3, except for the below described points.

In FIG. 6, the reference characters identical to those in the first embodiment shown in FIG. 3 designate identical components or portions. In addition, unless otherwise indicated, electrical connection in this embodiment is similar to that in the first embodiment.

A feature of this embodiment different from the first embodiment is as follows.

A series circuit including two LEDs 3a and 3b having the same current/luminous intensity characteristics is connected to the transistor Tr. The LED 3a emits radiation energy IR1 to the PBS device 1. The other LED 3b emits radiation energy Ir2 to the silicon photodiode 2. A system comprising the pinhole 5a, the LED 3a and the Pbs device 1 and a system comprising the LED 3b and the silicon photodiode 2 are disposed to be optically separated so that the radiation energy Ir from the LED 3a may not be applied to the silicon photodiode 2, that the radiation energy Ir2 from the LED 3b may not be applied to the PBS device 1 and that the incident energy Im1 to be measured may not be applied to the silicon photodiode 2. Because of this optical separation, such a filter 4 as in the first embodiment is not provided.

Other details in the construction and the operation are the same in the first embodiment and therefore description thereof is omitted.

Figure 7:
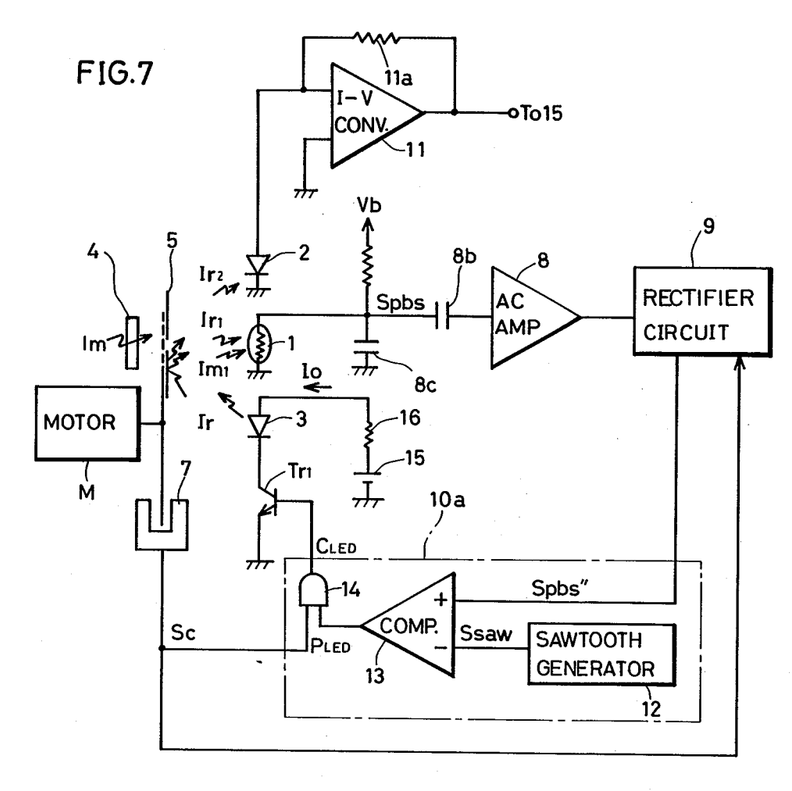
FIG. 7 is an electric circuit diagram of a photoelectric conversion processing apparatus according to a third embodiment of the present invention.

FIG. 7 is a circuit diagram of a photoelectric conversion processing apparatus of a third embodiment.

In FIG. 7, the reference characters identical to those in the first embodiment shown in FIG. 3 designate identical components or portions. In addition, unless otherwise indicated, this embodiment has the same connection and configuration as in the first embodiment.

A feature of this embodiment different from that of the first embodiment is as follows. A smoothing condenser 8c is provided between an output terminal of the PbS device 1 and the ground. An output terminal of the rectifier circuit 9 for outputting the rectified output Spbs" is connected to a plus input terminal of a comparator 13. A minus input terminal thereof is connected with an output terminal of a sawtooth wave generating circuit 12. An output terminal of the comparator 13 and an output terminal of the photo interrupter 7 are connected to two input terminals of an AND gate 14 and an output terminal of the AND gate 14 is connected to a base of a witching transistor Tr1. A cathode of the LED 3 is connected to a collector of the transistor Tr1 and an anode of the LED 3 is connected to a plus terminal of a constant voltage source 15 through a resistor 16.

The sawtooth wave generating circuit 12, the comparator 13 and the AND gate 14 form the control circuit 10a which constitutes the characteristic feature of the present invention. The other portions are constructed in the same manner as in the first embodiment and therefore description thereof is omitted.

Figure 8:
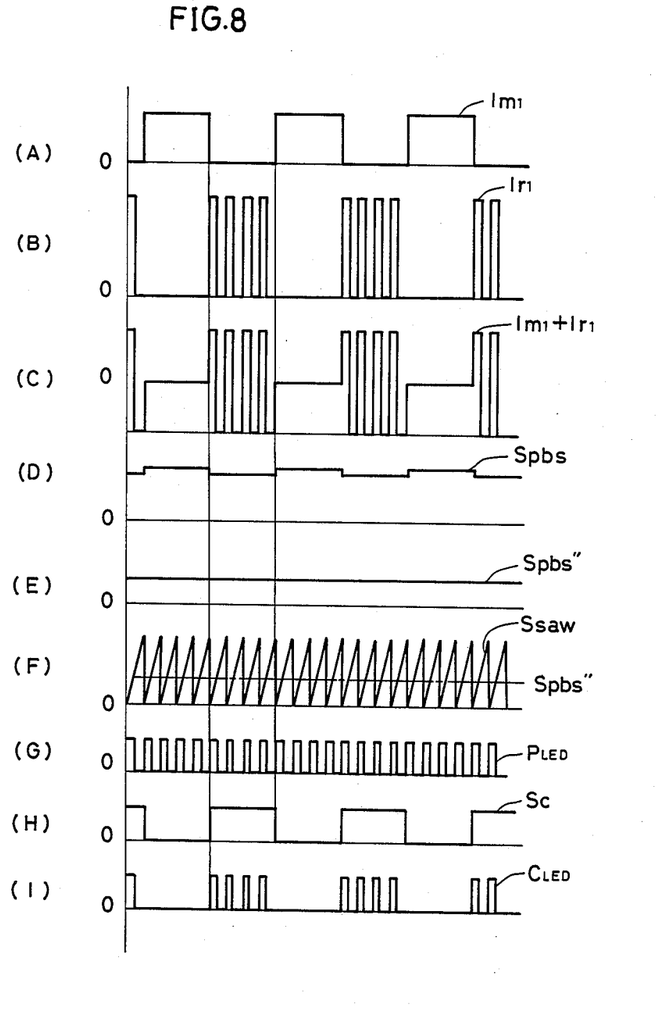
FIG. 8 is a timing chart for explaining operation of the embodiment shown in FIG. 7.

FIG. 8 is a timing chart for explaining operation of the embodiment shown in FIG. 7. Referring to this timing chart in FIG. 8, the operation of this third embodiment will be described. The incident energy Im1 to be measured, applied to the PbS device 1 is as shown in (A) of FIG. 8, is dependent on the opening and closing of the pinhole 5a by rotation of the chopper 6.

The sawtooth wave generating circuit 12 outputs a sawtooth wave signal Ssaw shown in (F) of FIG. 8. This sawtooth wave signal Ssaw is compared with the output Spbs" of the rectifier circuit 9 shown in (E) of FIG. 8. If a level of the output Spbs" is higher than a level of the sawtooth wave signal Ssaw, a pulse signal $P_{LED}$ is outputted from the comparator 13 as shown in (G) of FIG. 8.

The open/close state detection signal Sc attains the H level when the pinhole 5a is closed by the chopper 6, as shown in (H) of FIG. 8. Consequently, when the incident energy Im1 to be measured is intercepted, a control signal $C_{LED1}$ in the form of pulses shown in (I) of FIG. 8 is outputted from the AND gate 14 so that the transistor Tr1 is intermittently turned on and off.

As a result, constant current 10 is caused to discontinuously flow from the constant voltage source 15 into the LED3 through the resistor 16 so that the LED3 intermittently emits the radiation energy Ir. Radiation energy Ir1 obtained by reflection of the radiation energy Ir on the reflection face 5b and applied to the PbS device 1 has a pulse-shaped waveform as shown in (B) of FIG. 8.

Accordingly, radiation energy (Im1 +Ir1) applied to the PbS device 1 dependent on opening and closing of the pinhole 5a by the chopper 6 is as shown in (C) of FIG. 8. An output of the PbS device 1 which receives this radiation energy (Im1 +Ir1) is smoothed by a smoothing condenser 8c so that an output Spbs having an AC component as shown in (D) of FIG. 8 is obtained. A DC component of this output Spbs is cut by the condenser 8b and then the output Spbs is amplified by the AC amplifier 8 so that an output Spbs' having the same waveform as shown in (D) of FIG. 8 is obtained. When the output Spbs' is rectified by the rectifier circuit 9, the rectified output Spbs" as shown in (E) of FIG. 8 is obtained. This rectified output Spbs" is inputted to the comparator 13 so as to be compared with the sawtooth wave signal Ssaw.

The level of the rectified output Spbs" becomes high as the Ac component contained in the smoothed output Spbs increases. Further, a pulse width of the pulse signal $P_{LED}$ outputted from the comparator 13 increases as the level of the rectified output Spbs" becomes high. Accordingly, a pulse width of the control signal $C_{LED1}$ also becomes large and a pulse width of the radiation energy Ir1 applied to the PbS device 1 also becomes large. In other words, the Ac component contained in the smoothed output Spbs decreases. Finally, the AC component disappears and an integrated value of the radiation energy Ir1 applied from the LED3 to the PbS device 1 with the pinhole 5a being closed by the chopper 6 becomes equal to an integrated value of the incident energy Im1 applied to the PbS device 1 with the pinhole 5a being opened by the chopper 6. Consequently, the same effect as in the first embodiment can be achieved.

Further embodiments of the present invention are as follows:

(a) an apparatus using a PbSe device instead of a PbS device;

(b) an apparatus using, as the first photodetector as described above, a photodetector having sensitivity exhibiting little dependency on temperature, though incident energy to be measured and an output thereof are not in an exactly proportional relation, or an apparatus using, as the first photodetector, a photodetector having an output exactly proportional to incident energy to be measured, though sensitivity thereof exhibits significant dependency on temperature;

(c) an apparatus in which the photo interrupter 7 for detecting opening and closing by the chopper 6 is not provided and instead radiation energy Ir of the LED3 modified to be continuously turned on is applied to the PbS device 1 by another chopper with a phase of the radiation energy Ir being opposite to that of radiation energy Im, so that there may be no necessity for the rectifier 9 which performs rectification in synchronism with the open/close state detection signal Sc.

In addition, as a modification of the third embodiment, a second light emitting device may be connected in series with the LED3 in the same manner as in the second embodiment so that light from the second light emitting device may be applied to the silicon photodiode 2.

Further, in the second embodiment, another circuit may be provided to cause a current equal to the current flowing in the LED 3a to flow in the LED 3b, instead of connecting the LEDs 3a and 3b in series with the transistor Tr, so that current having an equal value may flow in the LEDs 3a and 3b.

Moreover, the chopper 6 may be replaced by an electrochromic device (ECD) for intermittently closing the pinhole 5a by change in light transmittivity responsive to an electric signal.

According to the first to third embodiments of the present invention, when the pinhole is closed by the chopper, the control circuit controls the radiation energy emitted from the light emitting device so that the output level of the first photodetector may be constant irrespective of the open state or the close state of the pinhole. The radiation energy is detected by both of the first and second photodetectors. Accordingly, detection of the radiation energy of the light emitting device by the second photodetector is equivalent to detection of the incident energy to be measured.

Therefore, incident energy of a wavelength range different from the detectable wavelength range of the second photodetector can be indirectly measured by the second photodetector and thus the incident energy can be measured with high precision making use of the advantage that the output voltage of the second photodetector is exactly proportional to the incident energy or the advantage that the sensitivity has little dependency on temperature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Apparatus for measuring radiation comprising:
   a first detector to receive the radiation to be measured and to provide a corresponding first output signal;
   an emitter device for emitting radiation of at least a different wavelength than the radiation to be measured;
   a control circuit means for receiving the first detector output signal and driving the emitter device in a corresponding relationship to the output signal whereby the emitter device radiation is proportional to the radiation to be measured, and
   a second detector responsive to radiation emitted by the emitter device including the different wavelength radiation beyond that of the reception range of the first detector for providing a second output signal proportional to the radiation to be measured.

2. The measuring apparatus of claim 1 further including means for providing an output of the radiation to be measured form the second output signal.

3. The measuring apparatus of claim 1 wherein the first detector and the second detector have different sensitivities to wavelength ranges.

4. A photoelectric conversion processing apparatus comprising:
   first photodetecting means having a first spectrum sensitivity for detecting energy of radiation coming from a target object;
   optical control means for intermittently intercepting and permitting incidence of the radiation from the target object onto said first photodetecting means;
   second photodetecting means having a second spectrum sensitivity for detecting the energy of radiation, said second spectrum sensitivity having a prescribed wavelength range which overlaps with a wavelength range in said first spectrum sensitivity;
   radiation emitting means for emitting radiation having a wavelength included in said prescribed wavelength range, said radiation emitting means being disposed to cause said radiation therefrom to be incident on said fist and second photodetecting means;
   radiation emission control means, responsive to said first photodetecting means, for controlling the radiation emission of said radiation emitting means to bring about a prescribed relation between outputs of said photodetecting means in two cases, the one case in which incidence of the radiation from the target object onto said first photodetecting means is intercepted and the other case in which said incidence is permitted, and
   measuring means for measuring the energy of the radiation from said target object based on an output of said second photodetecting means.

5. A photoelectric conversion processing apparatus in accordance with claim 4, wherein:
   said prescribed relation corresponds to a relation in which the outputs of said first photodetecting means in said two cases are equal.

6. A photoelectric conversion processing apparatus in accordance with claim 4, wherein:
   said radiation emission control means enables said radiation emitting means to emit radiation only while the incidence of the radiation from the target object onto said first photodetecting means is intercepted.

7. A photoelectric conversion processing apparatus in accordance with claim 4, wherein
   said spectrum sensitivity of said first photodetecting means changes dependent on ambient temperature.

8. A photoelectric conversion processing apparatus in accordance with claim 4, wherein
   said spectrum sensitivity of said first photodetecting means changes dependent on intensity of the incident radiation.

9. A photoelectric conversion processing apparatus in accordance with claim 4, wherein said radiation emission control means comprises means for controlling intensity of the radiation emitted from said radiation emitting means, thereby to satisfy the condition of said prescribed relation.

10. A photoelectric conversion processing apparatus in accordance with claim 4, wherein
said radiation emission control means comprises means for controlling an amount of the radiation emitted from said radiation emitting means to satisfy the condition of said prescribed relation.

11. A photoelectric conversion processing apparatus in accordance with claim 4, wherein
said measuring the means comprises means for measuring temperature of said target object based on the output of said second photodetecting means.

12. A photoelectric conversion processing apparatus in accordance with claim 4, further comprising
optical shield means for preventing incidence of the radiation from said target object onto said second photodetecting means.

13. A photoelectric conversion processing apparatus in accordance with claim 12, wherein
said optical shield means includes:
a radiation transmitting portion for permitting the radiation from said target object to be transmitted toward said first photodetecting means, and
a radiation reflecting portion for reflecting the radiation from said radiation emitting and toward said first and second photodetecting means.

14. A photoelectric conversion processing apparatus comprising:
first radiation emitting means for emitting a first radiation;
second radiation emitting means for emitting a second radiation having an intensity or amount in a prescribed relation with an intensity or amount of the first radiation from said fist radiation emitting means;
first photodetecting means for detecting radiation from a target object and the first radiation from said first radiation emitting means;
optical control means for intermittently intercepting and permitting incidence of the radiation from said target object onto said first photodetecting means;
second photodetecting means for detecting the second radiation from said second radiation emitting means;
radiation emission control means, responsive to said first photodetecting means, for controlling said first and second radiation emitting means to bring about a prescribed relation between outputs of said first photodetecting means in two cases, the one case in which incidence of the radiation from the target object onto said first photodetecting means is intercepted and the other case in which said incidence is permitted, and measuring means for measuring the energy of the radiation from said target object based on an output of said second photodetecting means.

15. A photoelectric conversion processing apparatus in accordance with claim 14, wherein:
said prescribed relation corresponds to a relation in which the outputs of said first photodetecting means in said two cases are equal.

16. A photoelectric conversion processing apparatus in accordance with claim 14, wherein:
said radiation emission control means enables said first and second radiation emitting means to emit radiation only while the incidence of the radiation from the target object onto said first photodetecting means is intercepted.

17. A photoelectric conversion processing apparatus in accordance with claim 14, wherein
the spectrum sensitivity of said first photodetecting means changes dependent on temperature.

18. A photoelectric conversion processing apparatus in accordance with claim 14, wherein
the spectrum sensitivity of said first photodetecting means changes dependent on intensity of incident light.

19. A photoelectric conversion processing apparatus in accordance with claim 14, wherein
said radiation emission control means comprises means for controlling intensities of the radiations from said first and second radiation emitting means to cause the output of said first photodetecting means during said period in which the incidence of the radiation from said target object is intercepted by said optical control means to be in said prescribed relation with that during said period in which said incidence is permitted by said optical control means.

20. A photoelectric conversion processing apparatus in accordance with claim 14, wherein
said radiation emission control means comprises means for controlling amounts of the radiations from said first and second radiation emitting means to cause the output of said first photodetecting means during said period in which the incidence of the radiation from said target object is intercepted by said optical control means to be in said prescribed relation with the output of said first photodetecting means during said period in which said incidence is permitted by said optical control means.

21. A photoelectric conversion processing apparatus in accordance with claim 14, wherein
said first and second radiation emitting means are connected in series to one another, and
said radiation emission control means comprises means for supplying electric current for causing said first and second radiation emitting means connected in series to emit radiation.

22. A photoelectric conversion processing apparatus in accordance with claim 14, wherein
said measuring means comprises means for measuring temperature of said target object based on an output of said second photodetecting means.

* * * * *